(12) United States Patent
Shin

(10) Patent No.: US 7,546,087 B2
(45) Date of Patent: Jun. 9, 2009

(54) VOICE BULLETIN BOARD APPARATUS AND METHOD FOR CONTROLLING THE SAME

(75) Inventor: Jason Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 11/144,752

(22) Filed: Jun. 6, 2005

(65) Prior Publication Data

US 2006/0035625 A1   Feb. 16, 2006

(30) Foreign Application Priority Data

Aug. 10, 2004   (KR)   .................. 10-2004-0062746

(51) Int. Cl.
*H04B 7/00*   (2006.01)
(52) U.S. Cl. ............... 455/41.2; 455/413; 379/88.23
(58) Field of Classification Search ............. 455/414.1, 455/413, 41.2; 379/88.23, 88.25
See application file for complete search history.

(56) References Cited

U.S. PATENT DOCUMENTS

| | | | |
|---|---|---|---|
| 5,724,417 A * | 3/1998 | Bartholomew et al. | 379/211.05 |
| 5,963,626 A * | 10/1999 | Nabkel | 379/142.01 |
| 6,263,064 B1 * | 7/2001 | O'Neal et al. | 379/201.03 |
| 6,336,031 B1 * | 1/2002 | Schyndel | 455/41.2 |
| 6,611,673 B1 * | 8/2003 | Bayley et al. | 455/564 |
| 6,628,757 B1 * | 9/2003 | Cannon et al. | 379/67.1 |
| 7,183,925 B2 * | 2/2007 | Marshall et al. | 340/572.4 |
| 7,185,818 B2 * | 3/2007 | Salvato | 235/462.45 |
| 7,263,179 B2 * | 8/2007 | Sammon et al. | 379/88.21 |

FOREIGN PATENT DOCUMENTS

| | | |
|---|---|---|
| JP | 01-213748 A | 8/1989 |
| JP | A 2003-091794 | 3/2003 |
| JP | 03-102253 U | 3/2004 |

* cited by examiner

*Primary Examiner*—Simon Sing
(74) *Attorney, Agent, or Firm*—Sughrue Mion, PLLC

(57) ABSTRACT

A voice bulletin board apparatus and a method for controlling the same. The voice bulletin board apparatus includes: a tag for storing identity information of a user of a voice bulletin board; an identity information entry unit for receiving the identity information from the tag according to a non-contact method; and a controller for receiving identity information of a recording user and/or a receiving user from the identity information entry unit, and authenticating the received identity information so as to record and/or reproduce a voice message. The apparatus reads identity information of the users according to a non-contact scheme, resulting in a simplified authentication process, automatically reproduces the recorded voice message regardless of message reproduction intention of the receiving user selected by the recording user, such that it can actively and efficiently provide the selected receiving user with the voice message of the recording user.

15 Claims, 4 Drawing Sheets mar # VOICE BULLETIN BOARD APPARATUS AND METHOD FOR CONTROLLING THE SAME

CROSS-REFERENCE TO RELATED APPLICATION

This application claims the benefit of Korean Patent Application No. 10-2004-0062746, filed on Aug. 10, 2004 in the Korean Intellectual Property Office, the disclosure of which is incorporated herein by reference.

BACKGROUND OF THE INVENTION

1. Field of the Invention

The present invention relates to a voice bulletin board apparatus and a method for controlling the same, and more particularly to a voice bulletin board apparatus and method for improving an authentication procedure needed for the voice bulletin board apparatus.

2. Description of the Related Art

A voice bulletin board apparatus has been used to record/reproduce voice messages, and has been widely applied to the Internet and mobile phones.

An authentication procedure for authenticating a user who can use a bulletin board must be performed to use the aforementioned voice bulletin board apparatus. The voice bulletin board apparatus requires a log-in system, which receives menu information for authenticating the identity of a user who records/reproduces a voice message and identity information (i.e., personal information) of a voice recorder user or voice receiver user, and performs user authentication using the received information.

In the case of recording the voice message, the voice bulletin board apparatus must receive identify information (e.g., name, and password, etc.) of the recorder user from a user interface and must verify the received identity information. Also, even in the case where the receiver user of the voice message desires to reproduce the received voice message, the voice bulletin board apparatus must receive identity information of the receiver user from such a user interface and must verify the received identity information, resulting in greater inconvenience of the user. Therefore, a method for simplifying the aforementioned complicated user authentication procedure is required to reduce inconvenience of the users.

Although a voice message transmitted to the receiver user has been previously recorded, the receiver user cannot immediately hear the voice message, and cannot hear the voice message before manually recognizing the presence of the voice message. In this way, the receiver user must manually find only his or her voice messages from a plurality of recorded voice messages in order to hear desired voice messages, resulting in greater inconvenience of the user.

Furthermore, there is no method for controlling reproduction of the voice message before a receiver user selected by a recorder user directly hears the voice message recorded in the voice bulletin board, such that the conventional voice bulletin board apparatus has a disadvantage in that the receiver user cannot actively and efficiently receive the voice message.

SUMMARY OF THE INVENTION

Therefore, it is an object of the invention to provide a voice bulletin board apparatus and a method for controlling the same, which simplifies a user authentication procedure and automatically reproduces a voice message when a receiver user passes the voice bulletin board apparatus.

Additional objects and/or advantages of the invention will be set forth in part in the description which follows and, in part, will be obvious from the description, or may be learned by practice of the invention.

In accordance with an exemplary embodiment of the invention, the above and/or other objects can be achieved by the provision of a voice bulletin board apparatus, comprising: a tag for storing identity information of a user of a voice bulletin board; an identity information entry unit for receiving the identity information from the tag according to a non-contact method; and a controller for receiving identity information of a recording user and/or a receiving user from the identity information entry unit, and authenticating the received identity information so as to record and/or reproduce a voice message.

Preferably, the tag wirelessly outputs the identity information in response to an RF (Radio Frequency) signal; and the identity information entry unit transmits the RF signal to the tag, and receives identity information from the tag.

Preferably, the controller authenticates the recording user of the voice message, and receives identity information of the receiving user of the recorded voice message.

Preferably, the controller reproduces the recorded voice message corresponding to the receiving user when the receiving user selected by the recording user is authenticated.

Preferably, the voice message is automatically reproduced regardless of whether the receiving user desires to reproduce the message.

Preferably, the voice bulletin board apparatus further comprises an entry unit for entering an input command of the user, and transmitting the identity information of the receiving user to the controller.

Preferably, the entry unit is indicative of a touchpad operated by the user.

Preferably, the voice bulletin board apparatus is applied, for example, to a home appliance, such as a refrigerator, a television, a microwave oven, and/or an air conditioner.

In accordance with another object of the invention, there is provided in an exemplary embodiment thereof a method for controlling a voice bulletin board apparatus comprising the steps of: authenticating identity information of a recording user of a voice message to be recorded in a voice bulletin board, according to a non-contact or wireless method; storing a voice message recorded by the authenticated recording user and identity information of the authenticated recording user; receiving identity information of a receiving user of the recorded voice message, and storing the identify information of the selected receiving user; and reproducing the recorded voice message when the selected receiving user is authenticated.

Preferably, the authenticating step of the recording user or the receiving user includes the steps of: receiving identity information from the tag attached to the recording or receiving user; comparing the received identity information with pre-registered identity information; authenticating the received identity information when the received identity information is equal to the pre-registered identity information; and non-authenticating the received identity information when the received identity information is different from the pre-registered identity information.

Preferably, the method further comprises the step of: automatically reproducing the voice message regardless of whether the receiving user desires to reproduce the message when the receiving user selected by the recording user is authenticated.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
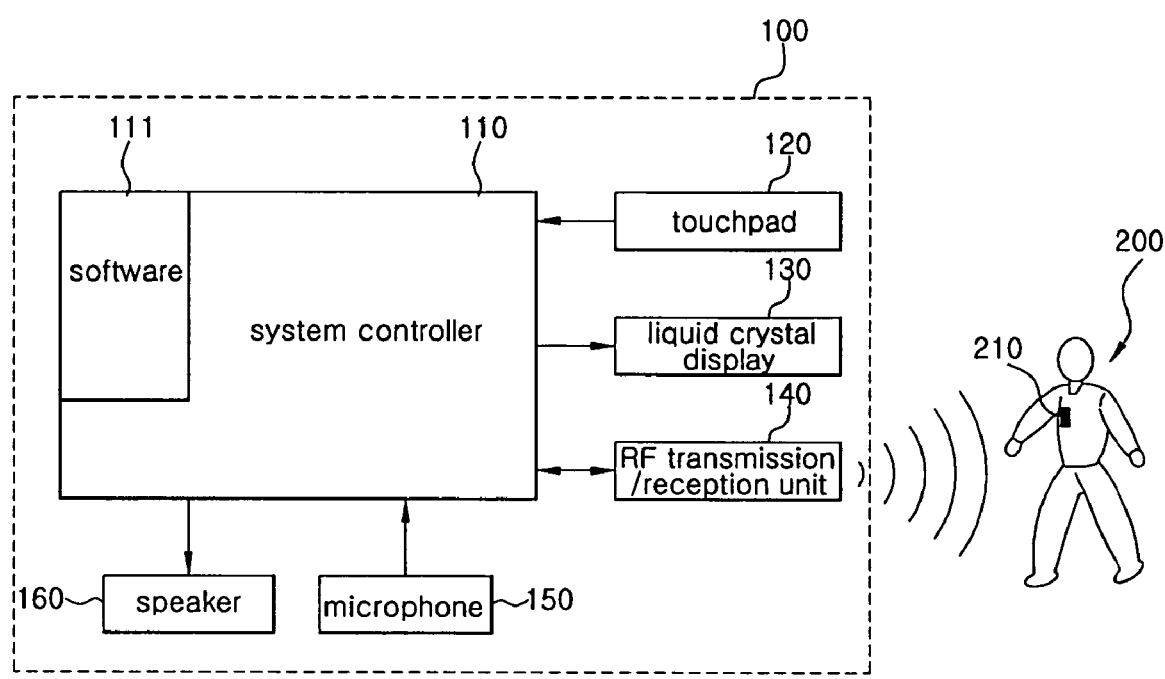
FIG. 1 is a block diagram illustrating a voice bulletin board apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As shown in FIG. 1, the voice bulletin board apparatus 100 includes a system controller 110 for controlling overall operations such as recording or reproduction of voice messages.

The system controller 110 includes software 111 for carrying out control operations. The software 111 stores user data for managing user registration, a control program for recording/reproducing voice messages, and recorded voice data, etc.

The voice bulletin board apparatus 100 includes a touchpad 120 for receiving an input command from a user, a liquid crystal display 130 for displaying guide and graphic information when recording/reproducing the voice message, a microphone 150 for recording a voice signal of the user, and a speaker 160 for reproducing the recorded voice signal of the user.

The voice bulletin board apparatus 100 further includes an RF (Radio Frequency) transmission/reception module 140 for carrying out an authentication process according to a non-contact method using an RF ID (Identifier) tag 210 attached to a recording or receiving user 200. In this case, the RF ID tag 210 includes a memory chip for storing identity information (e.g., name and password, etc.) of the user 200.

The system controller 110 transmits an RF signal via the RF transmission/reception unit 140, and compares identity information read by the RF ID tag 210 of the recording or receiving user with pre-registered identity information in such a way that it carries out an authentication procedure. Provided that the recording or receiving user stays at the front of the voice bulletin board apparatus for a little while or passes the voice bulletin board apparatus, he or she can be authenticated without performing a data entry operation using an additional user interface, resulting in a simplified authentication procedure.

Figure 4:
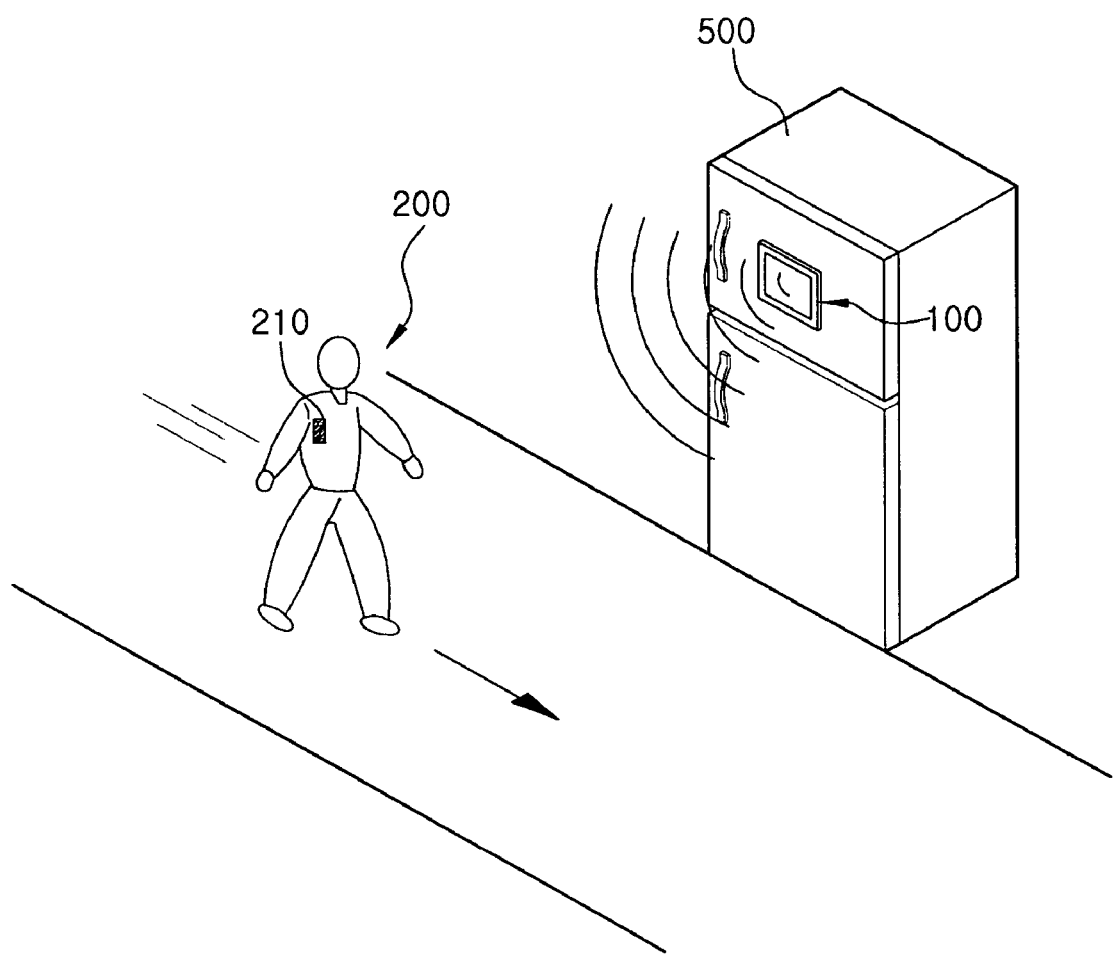
FIG. 4 is an example in which the voice bulletin board apparatus is applied to a refrigerator according to a second embodiment of the present invention.

If a desired receiving user for a recorded voice message is selected by a recording user, the system controller 110 checks identity information of the RF ID tag attached to a person who passes the voice bulletin board apparatus. In this case, if it is determined that the person who passes the voice bulletin board apparatus is determined to be the desired receiving user, then the system controller 110 automatically reproduces the voice message recorded by the recording user even though the receiving user does not carry out additional operations, such that the speaker 160 audibly generates the reproduced voice message. Therefore, the receiving user who passes the voice bulletin board apparatus can conveniently hear the voice message transmitted from the recording user, The voice bulletin board apparatus 100 of the present invention is installed in buildings or houses to establish transmission/reception of voice messages among many people. In this case, the voice bulletin board apparatus 100 can be implemented with an independent manufactured product, or can be integrated with a household appliance of other equipment into one body. For example, the voice bulletin board apparatus 100 is installed in a refrigerator 500 as shown in FIG. 4, such that it can be used as a medium for information transmission among members of a family.

Operations of the voice bulletin board apparatus according to an embodiment of the present invention will hereinafter be described.

Figure 2:
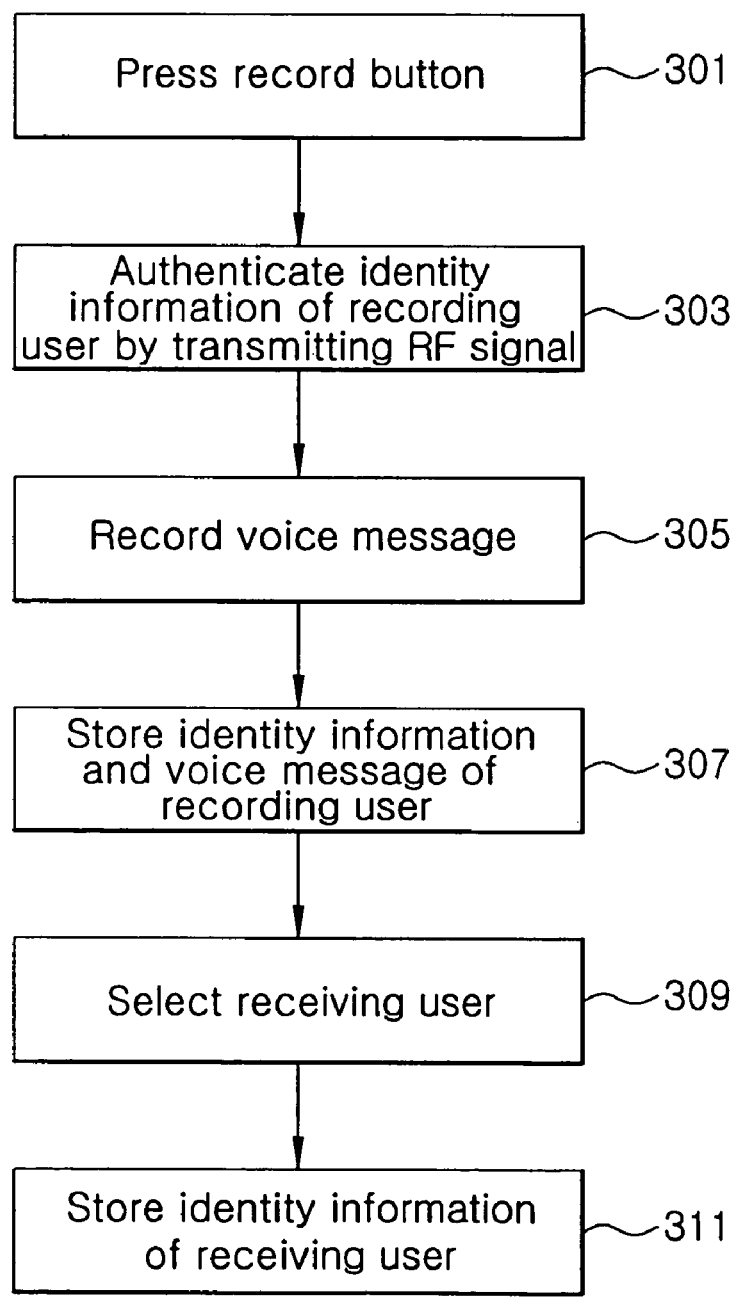
FIG. 2 is a flow chart illustrating a procedure for recording a voice message using the voice bulletin board apparatus according to an embodiment of the present invention.

Referring to FIG. 2, in the case of recording a voice message, a recording user 200 (FIG. 1) to which the RF ID tag 210 is attached presses a record button of the touchpad 120 at step 301. The system controller 110 transmits an RF signal via the RF transmission/reception unit 140 to read identity information stored in the RF ID tag 210, compares the read identity information of the recording user with pre-registered information, and authenticates the recording user if it is determined that the read identify information of the recording user is equal to the pre-registered identity information at step 303. After the system controller 110 authenticates the recording user, the recording user records a voice message using the microphone 150 at step 305. The system controller 110 stores the identity information and the voice message of the recording user at step 307. The recording user selects a desired receiving user, who will receive the voice message, using the touchpad 120 at step 309. The system controller 110 stores information of the receiving user selected by the recording user in association with the recorded voice message at step 311.

Figure 3:
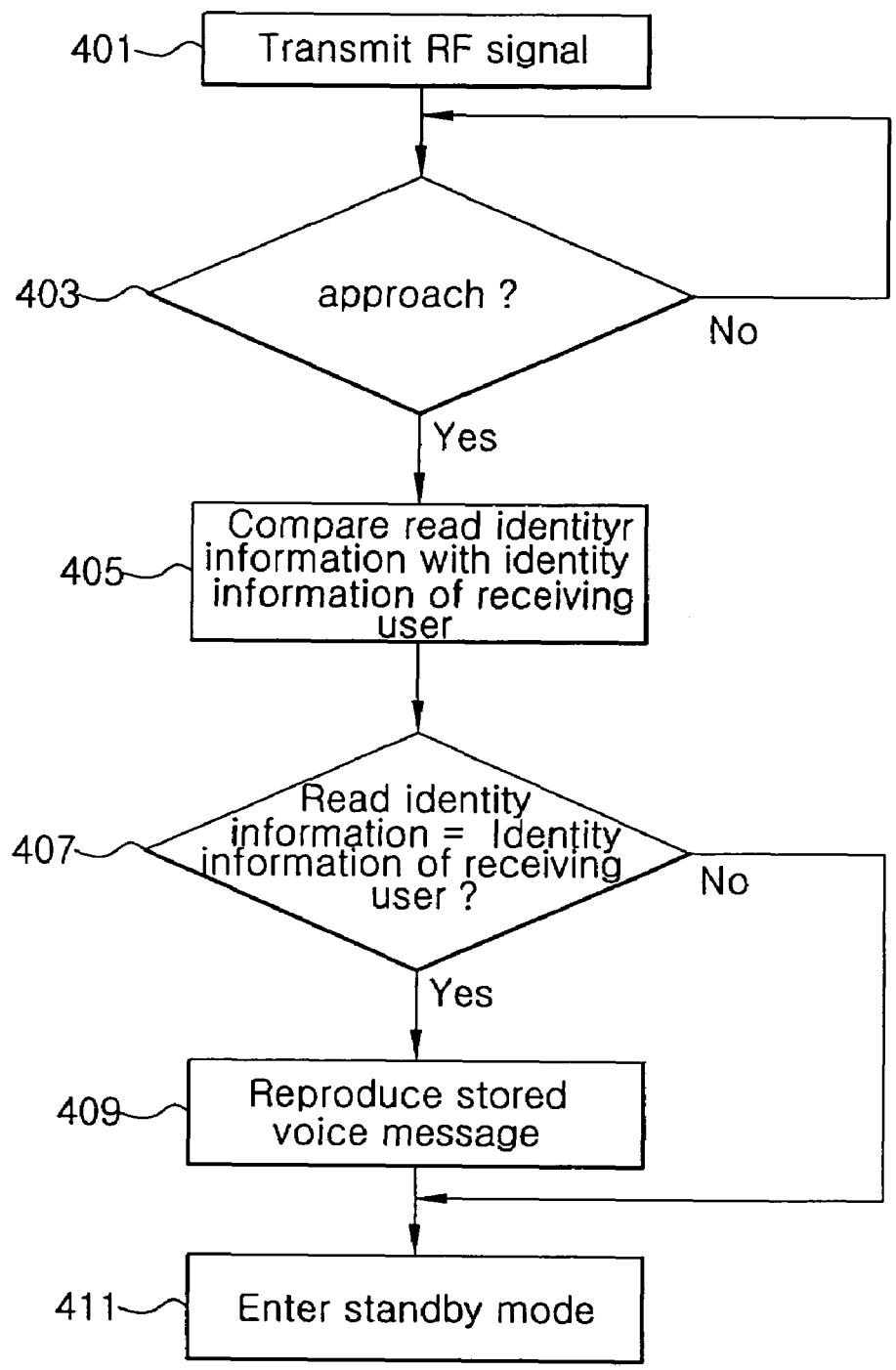
FIG. 3 is a flow chart illustrating a procedure for automatically reproducing a recorded voice message using the voice bulletin board apparatus according to an embodiment of the present invention.

Referring to FIG. 3, if a voice message to be transmitted to the receiving user is present, the system controller 110 transmits an RF signal via the RF transmission/reception unit 140 in order to read identity information of a person who passes the voice bulletin board apparatus at step 401. If the RF transmission/reception unit 140 generates a response to the RF signal, the system controller 110 determines whether there is a person who approaches the voice bulletin board apparatus at step 403. If it is determined that the response signal is generated from the RF transmission/reception unit 140, the system controller 110 compares the identity information read by the RF ID tag attached to the person who passes the voice bulletin board apparatus with other identity information of the receiving user of the recorded voice message at step 405, and determines whether the identity information read by the RF ID tag is equal to the other identity information of the receiving user of the recorded voice message at step 407. If it is determined that the identity information read by the RF ID tag is equal to the other identity information of the receiving user of the recorded voice message at step 407, then the system controller 110 audibly outputs the recorded voice message via the speaker 160 at step 409 in such a way that the recorded voice message is automatically reproduced. In the case of reproducing the recorded voice message, the system controller 110 enters a standby mode to record a new voice message of the recording user at step 411.

If it is determined that the identity information read by the RF ID tag is different from the other identity information of the receiving user of the recorded voice message at step 407, then the system controller 110 enters the standby mode at step 411.

As is apparent from the above description, a voice bulletin board apparatus and method according to an embodiment of the present invention authenticates a recording user and a receiving user by reading identity information of the users according to a non-contact method, such that it can perform user authentication without performing a data input operation using an additional user interface, resulting in a simplified authentication process. Also, the voice bulletin board apparatus verifies identity information of the receiving user according to a non-contact method when the receiving user passes the voice bulletin board apparatus, such that it can automatically reproduce a recorded voice message. In conclusion, the receiving user can easily hear the voice message of the recording user without performing an additional operation for the recorded voice message in such a way that the voice bulletin board apparatus can actively and efficiently provide the selected receiving user with the voice message of the recording user.

Although particular embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A voice bulletin board apparatus, comprising:
   a tag which stores identity information of a user of a voice bulletin board;
   an identity information entry unit which receives the identity information from the tag according to a contact-free method; and
   a controller which receives identity information of a recording user from the identity information entry unit, authenticates the received identity information of the recording user, records a voice message by the recording user to generate a recorded voice message, and stores the received identify information of the recording user in correspondence with the recorded voice message,
   wherein the tag wirelessly outputs the identity information in response to a radio frequency (RF) signal, and
   wherein the identity information entry unit transmits the RF signal to the tag, and receives identity information from the tag.

2. The voice bulletin board apparatus as set forth in claim 1, wherein the controller receives first identity information of a receiving user from the identity information entry unit, the first identity information provided by the recording user of the recorded voice message, and stores the first receiving user identity information corresponding with the recorded voice message.

3. The voice bulletin board apparatus as set forth in claim 2, wherein the controller receives second identity information of the receiving user from the identity information entry unit, authenticates the second identity information with the first identity information, and reproduces the recorded voice message to the receiving user when the second identity information is authenticated.

4. The voice bulletin board apparatus as set forth in claim 3, wherein:
   the voice message is automatically reproduced regardless of whether the receiving user desires to reproduce the message.

5. The voice bulletin board apparatus as set forth in claim 3, wherein if more than one recording user records a voice message for the receiving user, the controller reproduces each voice message for the receiving user from each recording user.

6. The voice bulletin board apparatus as set forth in claim 2, further comprising:
   an entry unit for entering an input command of the user, and transmitting the first identity information of the receiving user to the controller.

7. The voice bulletin board apparatus as set forth in claim 6, wherein:
   the entry unit is indicative of a touchpad operated by the user.

8. The voice bulletin board apparatus as set forth in claim 1, wherein: the voice bulletin board apparatus is applied to one of a refrigerator, a television, a microwave oven, and an air conditioner.

9. A method for controlling a voice bulletin board apparatus comprising:
   receiving identity information from a tag attached to a user, according to a non-contact method;
   authenticating the identity information of the user;
   storing the identity information of the authenticated user;
   storing a voice message recorded by the authenticated user if the authenticated user is a recording user and
   reproducing the recorded voice message if the authenticated user is a receiving user,
   wherein the tag wirelessly outputs the identity information in response to a radio frequency (RF) signal, and
   wherein the RF signal is transmitted to the tag, and the identity information is received from the tag.

10. The method as set forth in claim 9, wherein the authenticating step of the recording user or the receiving user includes:
    comparing the received identity information with pre-registered identity information;
    authenticating the received identity information when the received identity information is equal to the pre-registered identity information; and
    non-authenticating the received identity information when the received identity information is different from the pre-registered identity information.

11. The method as set forth in claim 9, farther comprising:
    automatically reproducing the voice message regardless of whether the receiving user desires to reproduce the message when the receiving user selected by the recording user is authenticated.

12. A voice bulletin board apparatus, comprising:
    a radio frequency (RF) reception unit which wirelessly receives identity information;
    a controller, coupled to said RF reception unit, which authenticates the received identity information, records a voice message in response to authentication of the received identity information, stores the received identify information in correspondence with the recorded voice message, reproduces the voice message in response to authentication of the received identity information; and a remote tag for storing the identity information,
wherein the remote tag wirelessly outputs the identity information in response to an RF signal.

13. The voice bulletin board apparatus as set forth in claim 12, further comprising:
an RF transmission unit which transmits an RF signal to the remote tag, and receives identity information from the tag.

14. The voice bulletin board apparatus as set forth in claim 12, wherein the voice bulletin board is coupled to a home appliance.

15. The voice bulletin board apparatus as set forth in claim 14, wherein the home appliance is one of a refrigerator, a television, a microwave oven, and an air conditioner.

* * * * *